US007300234B2

(12) United States Patent
Cope

(10) Patent No.: US 7,300,234 B2
(45) Date of Patent: Nov. 27, 2007

(54) POWER TRANSMISSION WITH BEAD DRIVE

(75) Inventor: Larry Cope, El Dorado Hills, CA (US)

(73) Assignee: Copeasetic Engineering, Inc., Eldorado Hills, CA (US)

( * ) Notice: Subject to any disclaimer, the term of this patent is extended or adjusted under 35 U.S.C. 154(b) by 0 days.

(21) Appl. No.: 11/621,597

(22) Filed: Jan. 10, 2007

(65) Prior Publication Data

US 2007/0160438 A1  Jul. 12, 2007

Related U.S. Application Data

(60) Provisional application No. 60/758,646, filed on Jan. 12, 2006.

(51) Int. Cl.
*B23C 9/00* (2006.01)
(52) U.S. Cl. ............... 409/234; 409/231; 409/135; 74/216.3; 408/239 R
(58) Field of Classification Search ........... 409/231, 409/232, 233, 234, 135, 136; 74/216.3; 408/239 R, 240
See application file for complete search history.

(56) References Cited

U.S. PATENT DOCUMENTS

| | | | |
|---|---|---|---|
| 0,572,593 A | 12/1896 | Barney | |
| 0,576,105 A | 2/1897 | Flindall | |
| 578,556 A | 3/1897 | Flindall | |
| 1,277,501 A | 9/1918 | Stinner | |
| 2,002,709 A | 5/1935 | Niederhauser | |
| 2,491,764 A | 12/1949 | Quillen | |
| 2,551,821 A | 5/1951 | Bengston | |
| 2,744,414 A * | 5/1956 | Alexeev | 74/216.3 |
| 2,817,256 A | 12/1957 | Malone | |
| 2,901,914 A * | 9/1959 | Preston | 74/216.3 |
| 3,349,637 A * | 10/1967 | Moore | 74/216.3 |
| 3,491,607 A * | 1/1970 | Fisher | 74/216.3 |
| 3,552,222 A * | 1/1971 | Beck | 74/216.3 |
| 3,718,051 A * | 2/1973 | Eck | 74/216.3 |
| 4,214,488 A | 7/1980 | Conrad | |
| 4,378,621 A * | 4/1983 | Babel | 29/26 A |
| 4,635,329 A * | 1/1987 | Holy et al. | 29/27 C |
| 4,657,453 A * | 4/1987 | Goulot et al. | 409/230 |
| 4,702,668 A * | 10/1987 | Carlisle et al. | 74/216.3 |
| 4,709,465 A * | 12/1987 | Lewis et al. | 409/230 |
| 4,739,668 A * | 4/1988 | David | 74/216.3 |
| 4,856,357 A * | 8/1989 | David | 74/216.3 |
| 4,862,757 A * | 9/1989 | Dahl | 74/216.3 |
| 4,952,784 A | 8/1990 | Pike | |
| 5,491,633 A * | 2/1996 | Henry et al. | 701/36 |
| 5,538,375 A * | 7/1996 | Kwapisz | 409/201 |

(Continued)

*Primary Examiner*—Dana Ross
(74) *Attorney, Agent, or Firm*—Dovas Law, P.C.

(57) ABSTRACT

A power transmission is provided. The power transmission includes a housing including a continuous channel following a three-dimensional path. A plurality of beads is located within the continuous channel and movable therein. A first sprocket is rotateably connected to the housing and forms a first portion of the continuous channel in movable contact with the plurality of beads. A second sprocket is rotateably connected to the housing and forms a second portion of the continuous channel in movable contact with the plurality of beads, the second sprocket having an axis of rotation angled with respect to an axis of rotation of the first sprocket. A milling tool and a method of removing material from a work piece are also provided.

23 Claims, 18 Drawing Sheets

U.S. PATENT DOCUMENTS

| | | | | |
|---|---|---|---|---|
| 6,159,125 A | * | 12/2000 | Miller | 74/216.3 |
| 6,193,624 B1 | * | 2/2001 | Lund | 74/216.3 |
| 6,832,880 B2 | * | 12/2004 | Colombo | 409/230 |
| 6,840,896 B2 | * | 1/2005 | Endo et al. | 409/231 |
| 2001/0046423 A1 | * | 11/2001 | Colombo | 409/230 |

* cited by examiner

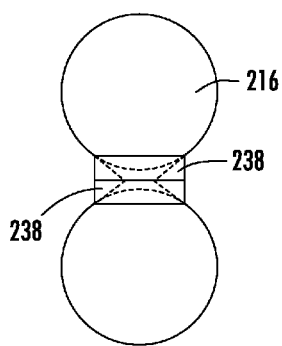
FIG. 8A
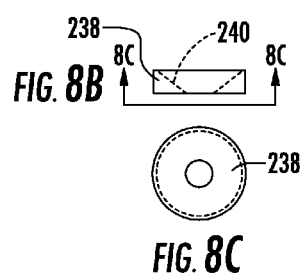
FIG. 8B
FIG. 8C
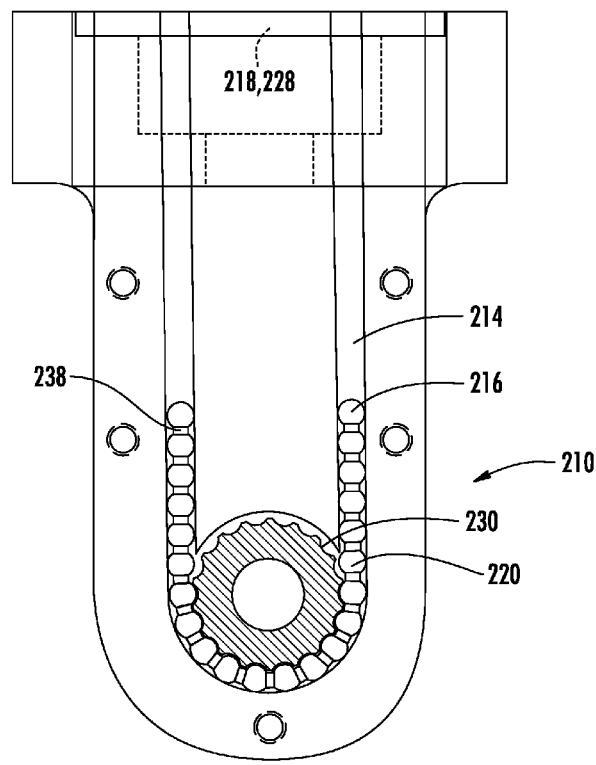
FIG. 7

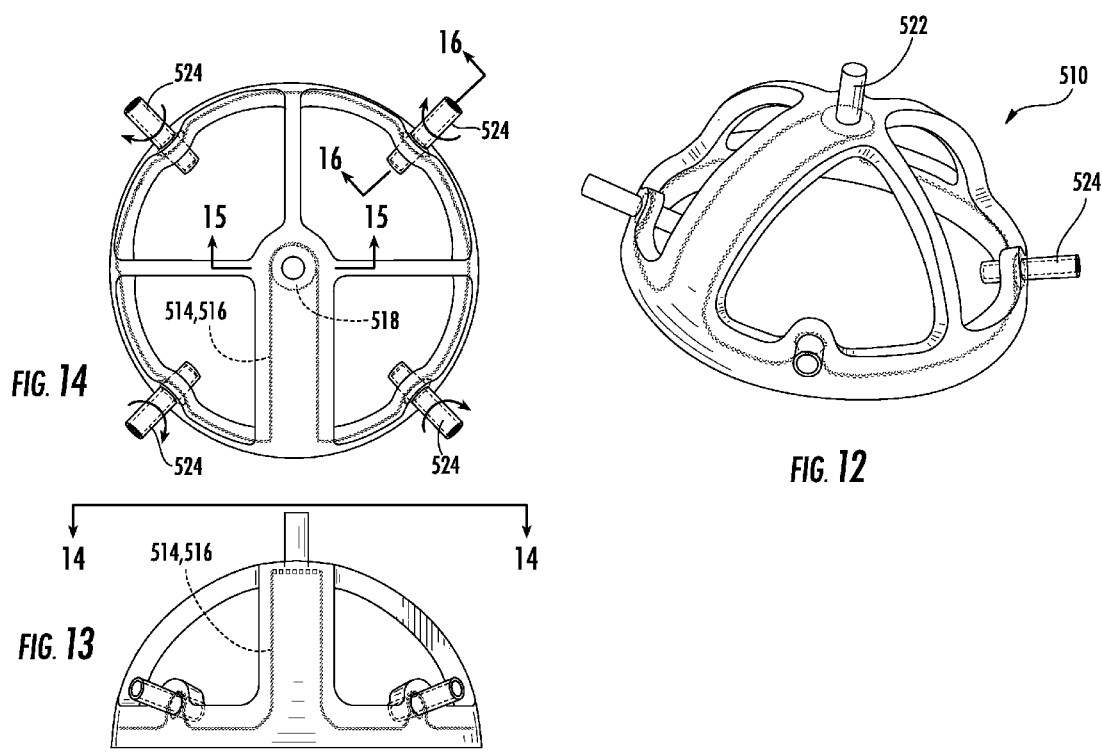

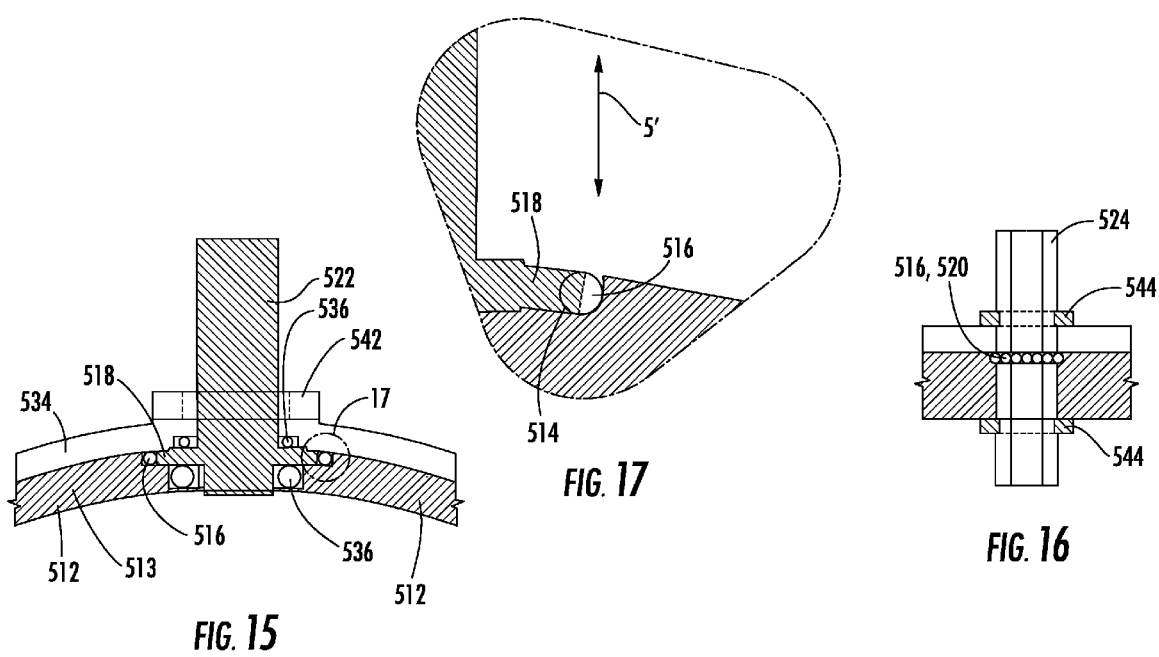

POWER TRANSMISSION WITH BEAD DRIVE

CROSS REFERENCE TO RELATED APPLICATION(S)

This application claims the benefit of U.S. Provisional Application No. 60/758,646, filed Jan. 12, 2006, which is incorporated by reference as if fully set forth.

BACKGROUND

Milling processes are an indispensable part of machine fabrication, woodworking, artistic sculpture, and production endeavors of varied vocation. While there have been many advancements in milling processes over the years, including the advent of computer numerical control (CNC) milling, the basic process of rotating a milling bit to remove material from a work piece is unchanged. Milling bits such as end mills are typically attached to an arm of a milling machine which makes one or more passes on a work piece to create a desired form. Often times, it is difficult or impossible to position a work piece in a manner in which the milling machine arm can remove material from a work piece. Further, certain designs require several cutting passes making it impractical and time consuming to obtain a desired form from a work piece.

In view of the above, it would be desirable to provide a device which allows a user more freedom to position a work piece in a preferred manner for milling. Moreover, it would be desirable to provide a device which allows a milling machine to create a desired form on a work piece with a minimum number of passes.

SUMMARY

The present invention provides a power transmission. The power transmission includes a housing including a continuous channel following a three-dimensional path. A plurality of beads is located within the continuous channel and movable therein. A first sprocket is rotateably connected to the housing and forms a first portion of the continuous channel in movable contact with the plurality of beads. A second sprocket is rotateably connected to the housing and forms a second portion of the continuous channel in movable contact with the plurality of beads, the second sprocket having an axis of rotation angled with respect to an axis of rotation of the first sprocket.

The present invention also provides a milling tool. The milling tool includes a housing including a continuous channel and a plurality of beads located within the channel and movable therein. A first sprocket is rotateably connected to the housing and forms a portion of the continuous channel in movable contact with the plurality of beads. A second sprocket is rotateably connected to the housing and forms another portion of the continuous channel in movable contact with the plurality of beads, the second sprocket configured for connection to a milling bit for removing material.

The present invention further provides a method of removing material from a work piece. The method includes providing a milling tool including a housing which includes a continuous channel, a plurality of beads arranged within the channel in a substantially continuous chain and movable therein, an input sprocket rotateably connected to the housing and forming a first portion of the continuous channel in movable contact with the plurality of beads for transferring motion to the plurality of beads, and an output sprocket rotateably connected to the housing and forming a second portion of the continuous channel in movable contact with the plurality of beads for rotation by movement of the plurality of beads. The output sprocket is connected to a bit for removing material from a work piece. The input sprocket is rotated, whereby the output sprocket is automatically rotated. The work piece is engaged with the bit to remove material from the work piece.

BRIEF DESCRIPTION OF THE DRAWING(S)

The foregoing Summary as well as the following detailed description will be readily understood in conjunction with the appended drawings which illustrate preferred embodiments of the invention. In the drawings:

FIG. 7 is a front elevation view of a power transmission according to a second preferred embodiment of the present invention.

FIG. 8A is an enlarged elevation detail of power transmission beads and bead separators of the power transmission of FIG. 7.

FIG. 8B is an elevation view of one of the bead separators of FIG. 8A.

FIG. 8C is a plan view of the bead separator of FIG. 8B taken along line 8C-8C of FIG. 8B.

FIG. 12 is a perspective view of a power transmission according to a fifth preferred embodiment of the present invention.

FIG. 13 is an elevation view of the power transmission of FIG. 12.

FIG. 14 is a plan view of the power transmission of FIG. 12 taken along line 14-14 of FIG. 13.

FIG. 15 is a cross-section view of the power transmission of FIG. 12 taken along line 15-15 of FIG. 14.

FIG. 16 is a cross-section view of the power transmission of FIG. 12 taken along line 16-16 of FIG. 14.

FIG. 17 is an enlarged cross-section detail view taken from FIG. 15.

DETAILED DESCRIPTION OF THE PREFERRED EMBODIMENT(S)

Figure 1:
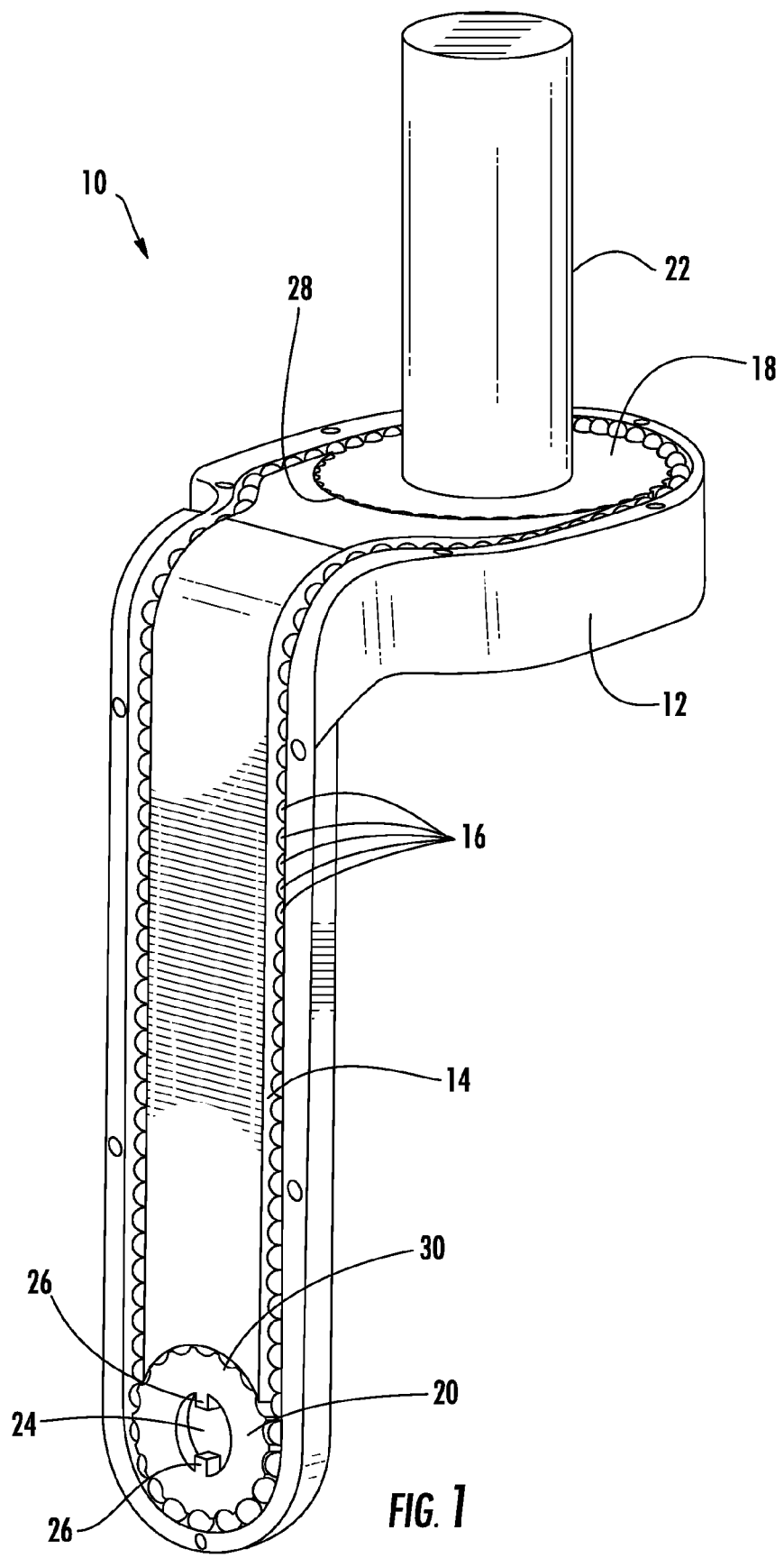
FIG. 1 is a perspective view of a power transmission according to a first preferred embodiment of the present invention.
Figure 2:
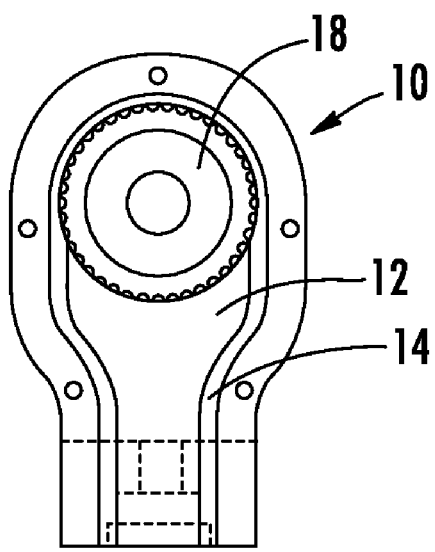
FIG. 2 is a top plan view of the power transmission of FIG. 1 with power transmission beads hidden for clarity.
Figure 3:
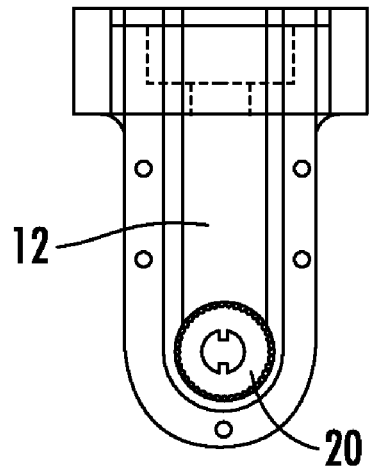
FIG. 3 is a front elevation view of the power transmission of FIG. 1 with power transmission beads hidden for clarity.

Certain terminology is used in the following description for convenience only and is not limiting. The words "right," "left," "top," and "bottom " designate directions in the drawings to which reference is made. The words "a" and "one" are defined as including one or more of the referenced item unless specifically stated otherwise. This terminology includes the words above specifically mentioned, derivatives thereof, and words of similar import. The phrase "at least one" followed by a list of two or more items, such as A, B, or C, means any individual one of A, B or C as well as any combination thereof.

The preferred embodiments of the present invention are described below with reference to the drawing figures where like numerals represent like elements throughout.

Referring to FIGS. 1-4, a power transmission 10 according to a first preferred embodiment of the present invention is shown. The power transmission 10 includes a housing 12 having a continuous channel 14 in which a plurality of beads 16 are movable therein. A first sprocket 18 and a second sprocket 20 are rotateably connected to the housing. The beads 16 form a substantially continuous chain but are preferably not attached to one another. The first and second sprockets 18, 20 each form a portion of the continuous channel 14 and are in movable contact with the plurality of beads 16. A shaft 22 is preferably attached to the first sprocket 18. The power transmission 10 as shown is useful as a milling tool for example by connecting the shaft 22 to a rotating portion of a milling machine and connecting a milling bit to the second sprocket 20.

As shown, each of plurality of beads 16 is preferably spherical and aligned in single file within the channel 14 in contact with or in close proximity to adjacent ones of the plurality of beads 16. Alternatively, beads of any suitable geometry including cylindrical may be used. While not wishing to be limited by a particular scale of components, the beads 16 are preferably less than ¼ inch in diameter, and more preferably between about 3/32 and ¼ inch in diameter. Alternatively, any size beads 16 can be utilized. Preferably, total cumulative gap, otherwise defined as backlash, between the installed beads 16 is between about ½% and about 3% of a diameter of a bead 16 (at 21 C). For a bead 16 having a diameter between about 3/32 inch and ¼ inch, the preferred cumulative gap is between about 0.0005 inch and about 0.007 inch.

The first and second sprockets 18, 20 include cups 28, 30 at peripheries thereof. When one of the cups 28, 30 is rotated into position along a path of the beads 16, it defines a portion of the channel 14 and receives a bead 16 traveling along the path within the channel 14. Rotational motion imparted to one of the first and the second sprockets 18, 20 is transferred to the other one of the first and second sprockets 28, 30 through the beads, which push one another along the path defined by the channel 14.

Figure 4:
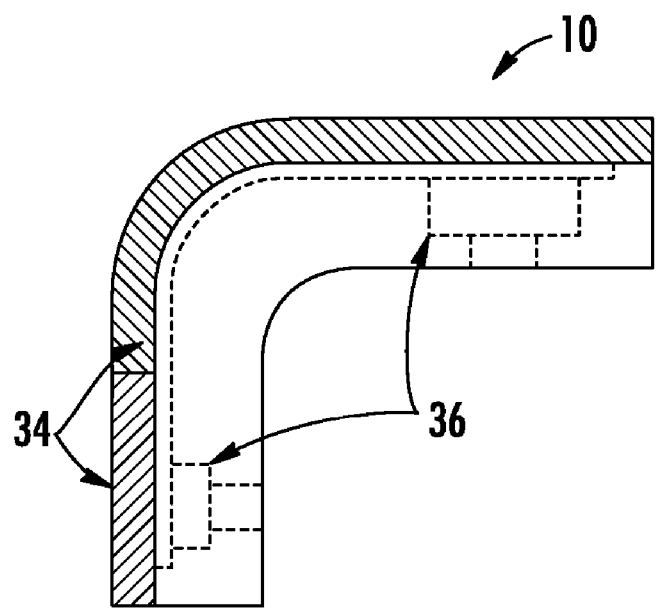
FIG. 4 is a side elevation view of the power transmission of FIG. 1, further including a cover and with power transmission beads hidden for clarity.

A cover 34, shown only in FIG. 4, is preferably provided over the beads 16 and the sprockets 18, 20. The cover 34 preferably forms a portion of the housing 12 and retains the moving components of the power transmission 10, including the beads 16 and sprockets 18, 20, within the housing 12. Ball bearings 36 are preferably provided to reduce rotation induce friction on the housing 12 and the sprockets 18, 20. Further, a lubricating fluid is preferably introduced along the bead path in the channel 14 and on the sprockets 18,20 to reduce friction and associated heat during the operation of the power transmission 10. The lubricating fluid is preferably a light industrial oil, although any suitable lubricating fluid can alternatively be provided.

The shaft 22 is preferably permanently attached with the first sprocket 18. Alternatively, the shaft 22 can be removable. As shown, the shaft 22 is configured for connection to a device for instilling rotational motion, for example a mill chuck, and power provided to the shaft 22 is transferable from the first sprocket 18 to the second sprocket 20. The second sprocket 20 preferably includes an aperture 24 for receiving a milling bit or any tool having an extended shaft. The aperture 24 preferably includes keyed portions 26 which cooperate with keyed portions of a tool bit shaft to retain the tool bit in a suitable manner. While the keyed portions 26 are shown as teeth, alternatively, they can include any suitable symmetric or asymmetric formation for preventing shaft rotation relative to the sprocket 20. As shown, the axis of rotation of the first sprocket 18 and shaft 22 are oriented perpendicularly (90 degrees) with an axis of rotation of the second sprocket 20. Alternatively, any suitable desired orientation angle between the axis of rotation of the first sprocket 18 and the axis of rotation of the second sprocket 20 can be provided. Further, alternative power transmission gear ratios can be achieved by modifying diameters and numbers of cups on the sprockets.

The housing 12 is preferably constructed of one or more solid pieces of steel, iron, aluminum, and/or other suitable material, with the channel 14 machined therein. The sprockets 18, 20 and the shaft 22 are also preferably formed of a suitable metallic material. The beads 16 are preferably formed of steel or other suitable metallic material of the type typically used for ball bearings.

Figure 6:
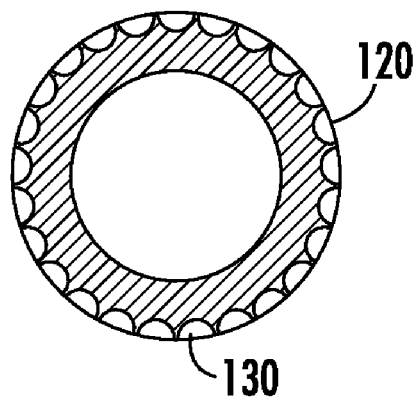
FIG. 6 is a cross-section view of the alternative shaft configuration of FIG. 5 taken along line 6-6 of FIG. 5.
Figure 5:
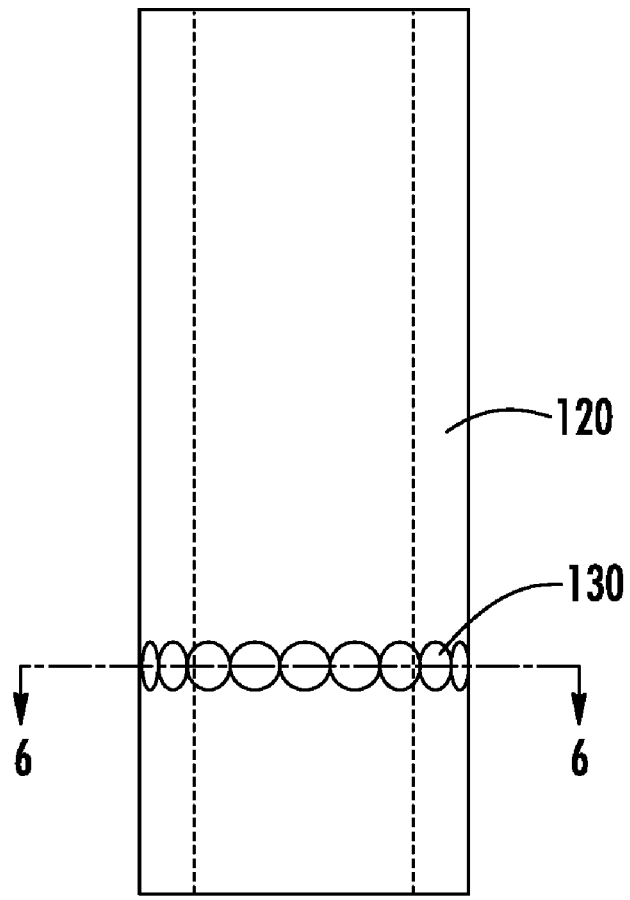
FIG. 5 is an elevation view of an alternative shaft configuration of the power transmission of FIG. 1.

Referring to FIGS. 5 and 6, an alternative shaft configuration is shown. The shaft 120 is suitable as an input or an output shaft for replacing the first sprocket 18 or the second sprocket 20. The shaft 120 functions as a sprocket and includes cups 130 to receive beads 16 during operation of the power transmission 10.

Referring to FIGS. 7 and 8, a power transmission 210 according to a second preferred embodiment of the present invention is shown. The power transmission 210 is similar to the transmission 10, but includes separators 238 between beads 216 to enhance interfacing between sprockets 218, 220 and the beads 216. The separators 238 are preferably cylindrical at a peripheral wall and have a conical recess 240 passing there through. Two separators 238 are combined together so that a largest diameter of the conical opening is provided adjacent each of the beads 216. The separators 238 are preferably held together by compressive forces, the conical tapers 240 allowing them to maintain consistent contact with the beads 216 during motion of the beads 216 through a channel 214, without being attached to the beads 216. Alternatively, the separators 238 can be held together by an adhesive, or each adjacent pair of separators 238 can be integrally formed as a single separator. It is noted that the separators 238 in this embodiment are self-aligning as the beads travel around various corners and have a sufficiently small diameter that they do not interfere with the cups 228, 230 of the sprockets 218, 220. These separators 238 can also be utilized in any of the other preferred embodiments described below.

Figure 9:
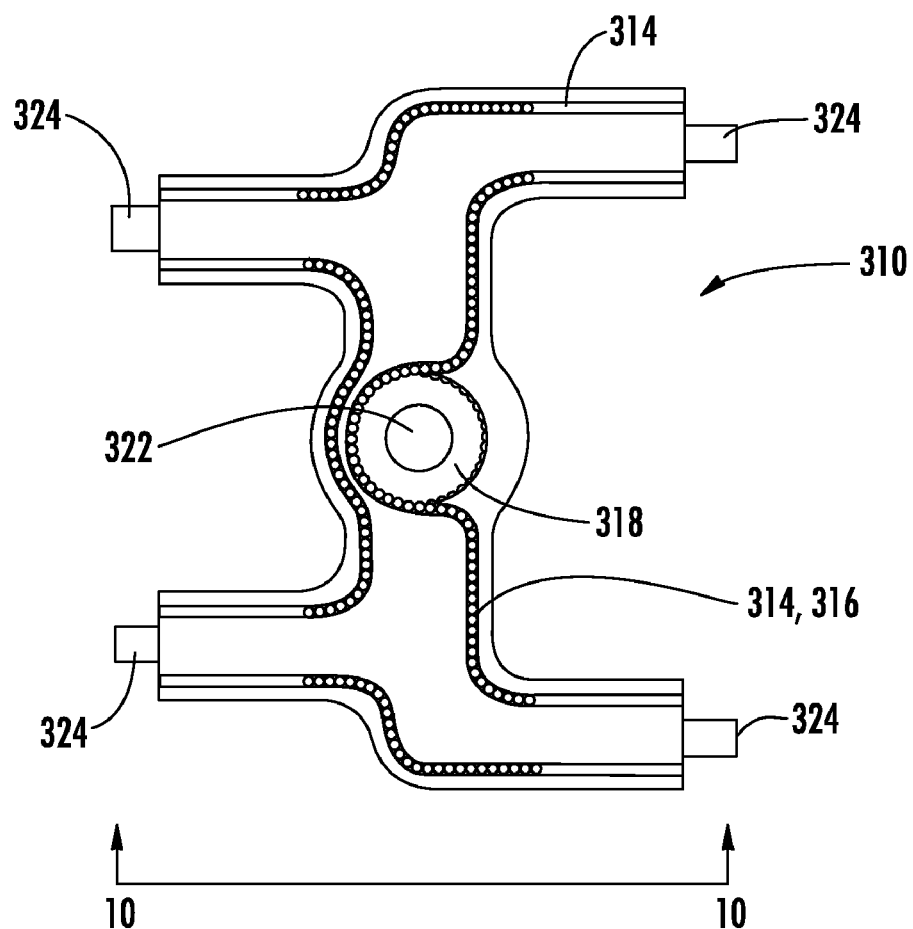
FIG. 9 is a plan view of a power transmission according to a third preferred embodiment of the present invention showing a portion of the provided power transmission beads.
Figure 10:
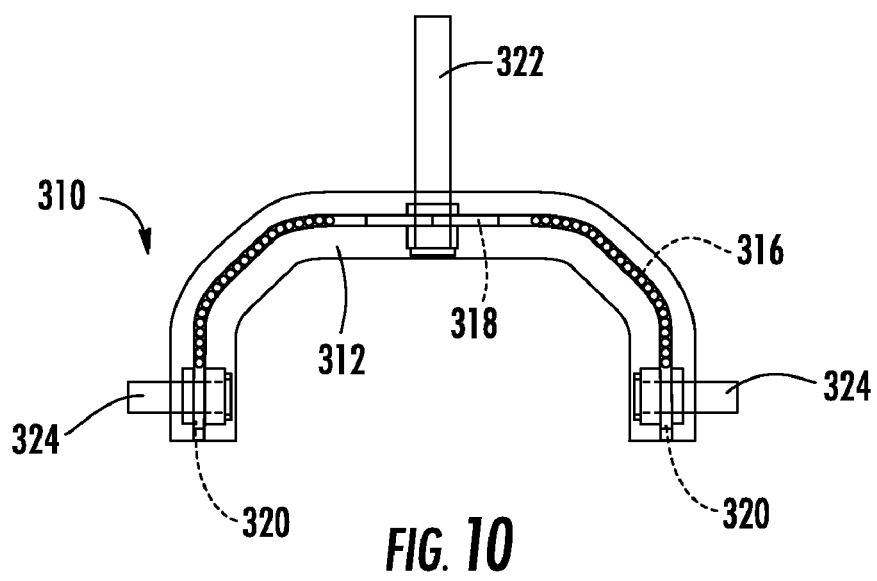
FIG. 10 is an elevation view of the power transmission of FIG. 9 taken along line 10-10 of FIG. 9.

Referring to FIGS. 9 and 10, a power transmission 310 according to a third preferred embodiment of the present invention is shown. The power transmission 310 includes a housing 312, an input sprocket 318, and four output sprockets 320. Each of the sprockets 318, 320 makes contact with beads 316 as they move within a channel 314, the sprockets 318, 320 forming a portion of the channel 314. In use, the input sprocket 318 can be rotated using the shaft 322 to motivate to the beads 316 resulting in the rotation of the output sprockets 320 and the rotation of milling bits or shafts 324 attached thereto. Alternatively, any one of the shafts 322, 324 can be powered to provide rotation to any other ones of the shafts 322, 324. The shafts 324, as depicted, preferably represent milling bits, shafts configured to connect with milling bits, or other machine tools for removing material from a work piece.

Figure 11:
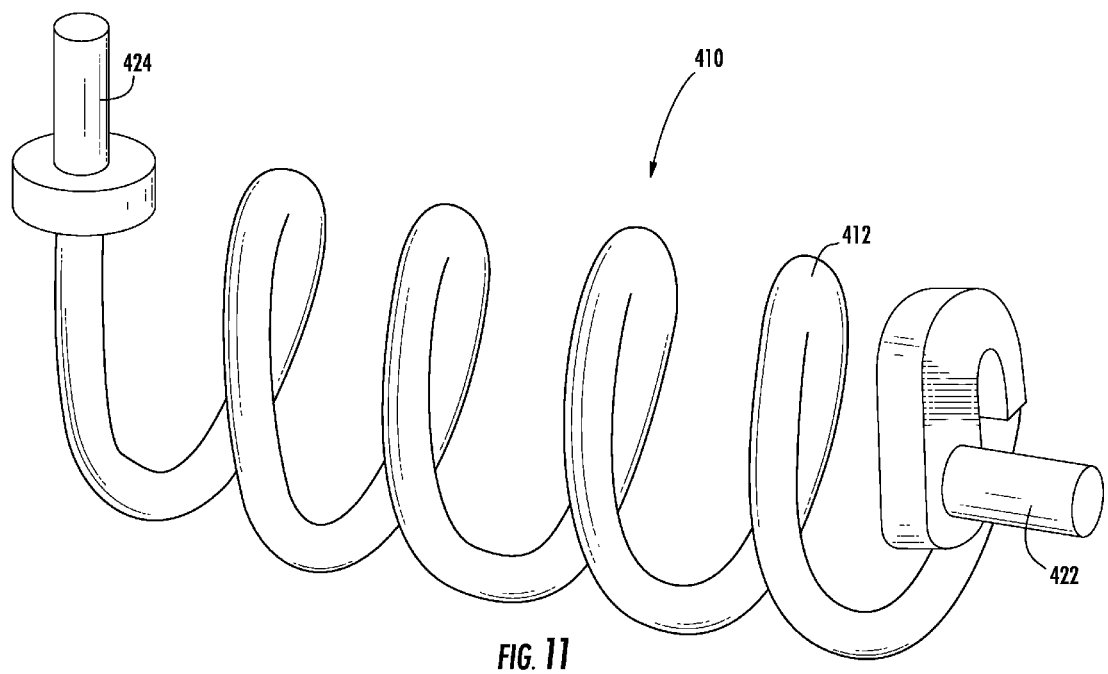
FIG. 11 is a perspective view of a power transmission according to a fourth preferred embodiment of the present invention.
Figure 18:
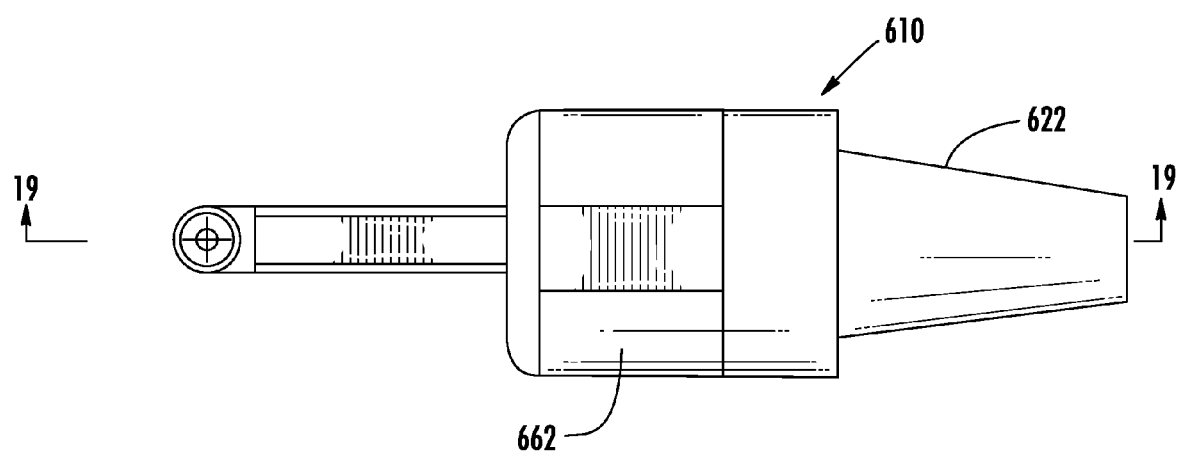
FIG. 18 is a plan view of a power transmission according to a sixth preferred embodiment of the present invention.
Figure 19:
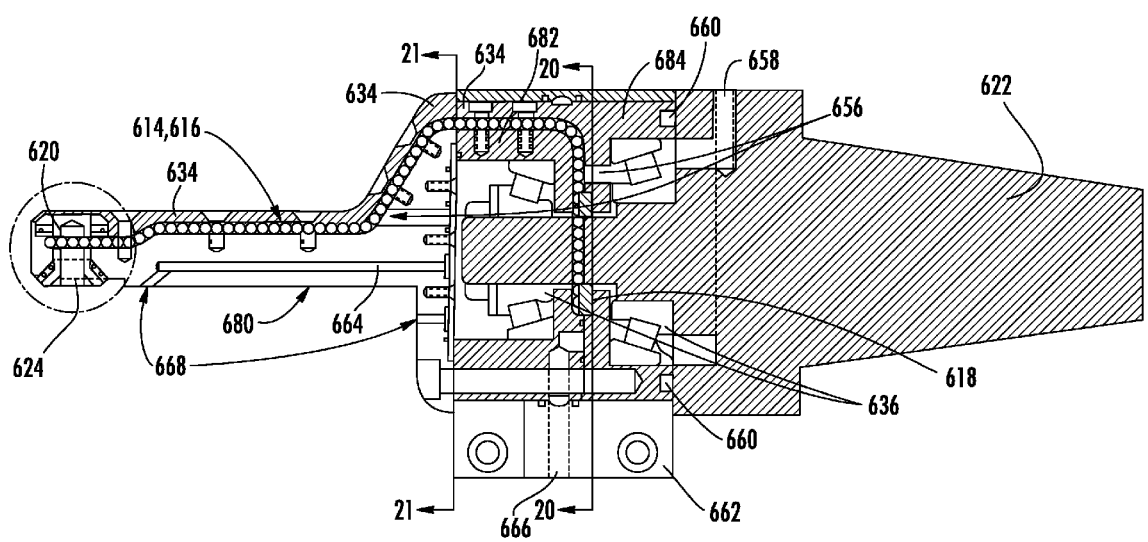
FIG. 19 is a cross-section view of the power transmission of FIG. 18 taken along line 19-19 of FIG. 18 and showing power transmission beads along an entire bead path for illustrative purposes.
Figure 20:
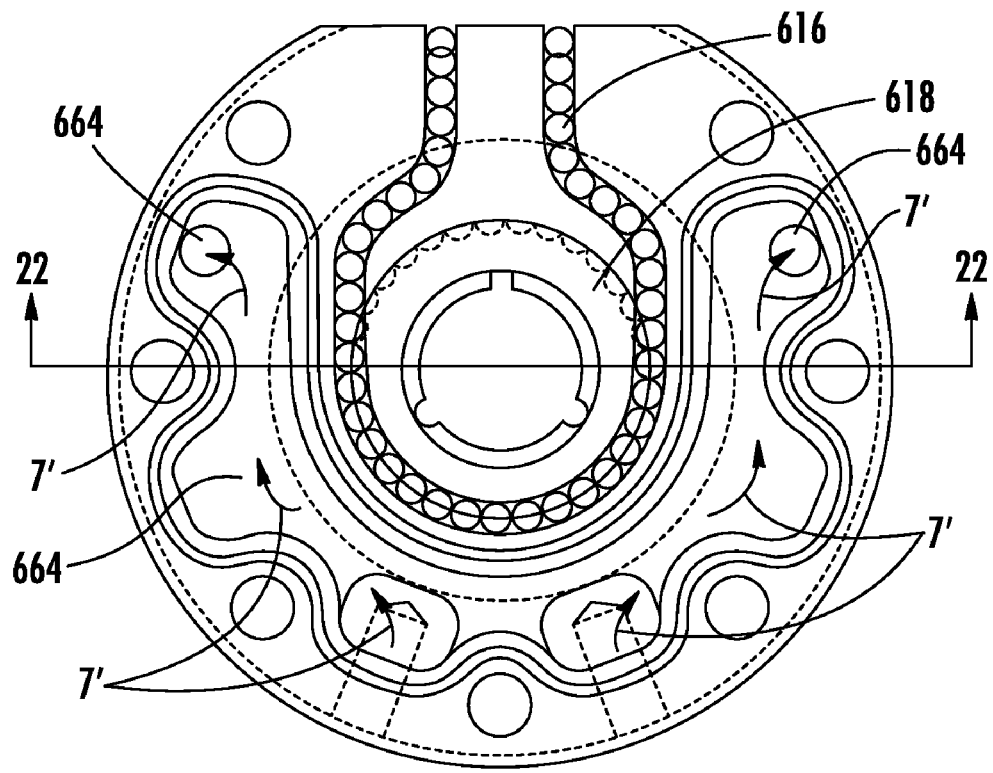
FIG. 20 is a cross-section view of the power transmission of FIG. 18 taken along line 20-20 of FIG. 19 with an input shaft and cover portion hidden for clarity.
Figure 22:
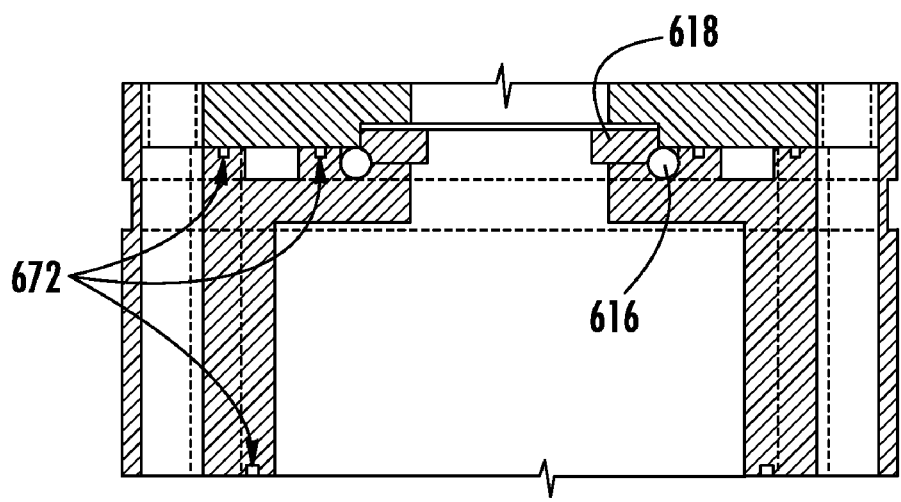
FIG. 22 is a cross-section view of the power transmission of FIG. 18 taken along line 22-22 of FIG. 20 with an input shaft hidden for clarity.
Figure 23:
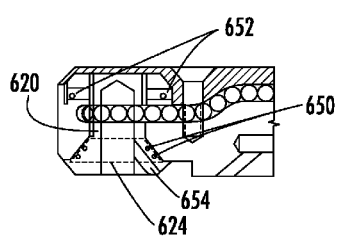
FIG. 23 is an enlarged cross-section detail view taken from FIG. 19.
Figure 21:
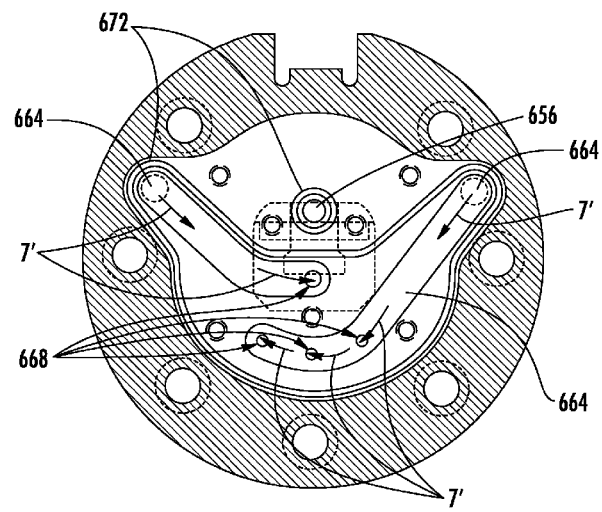
FIG. 21 is a cross-section view of the power transmission of FIG. 18 taken along line 21-21 of FIG. 19.
Figure 24:
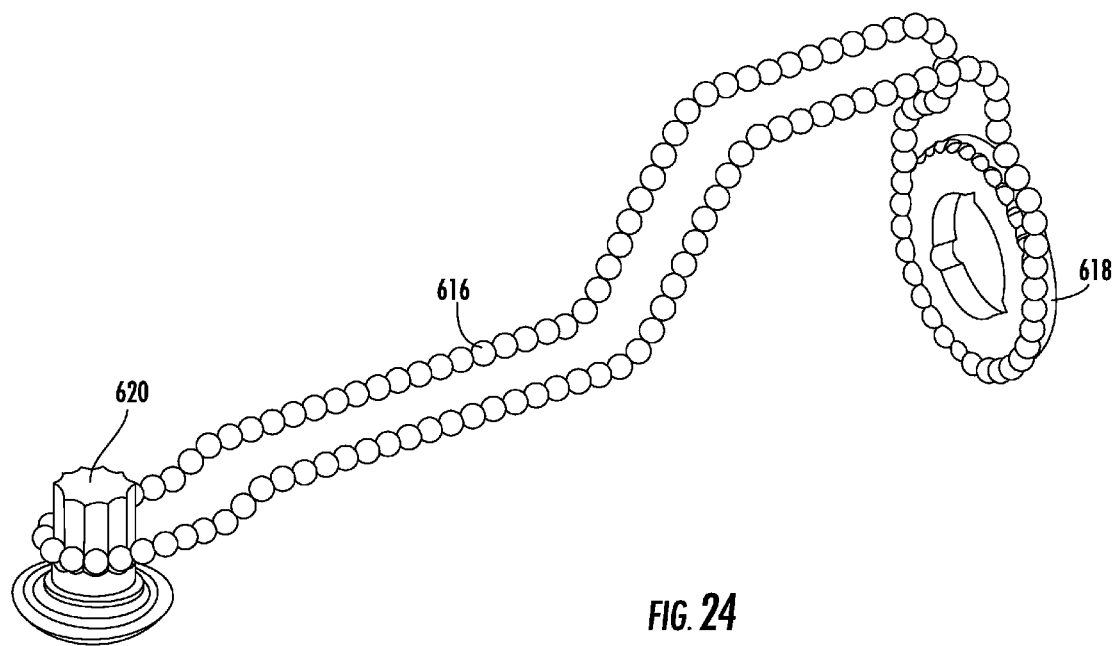
FIG. 24 is a perspective view of the power transmission of FIG. 18 showing only power transmission beads and power transmission sprockets.
Figure 25:
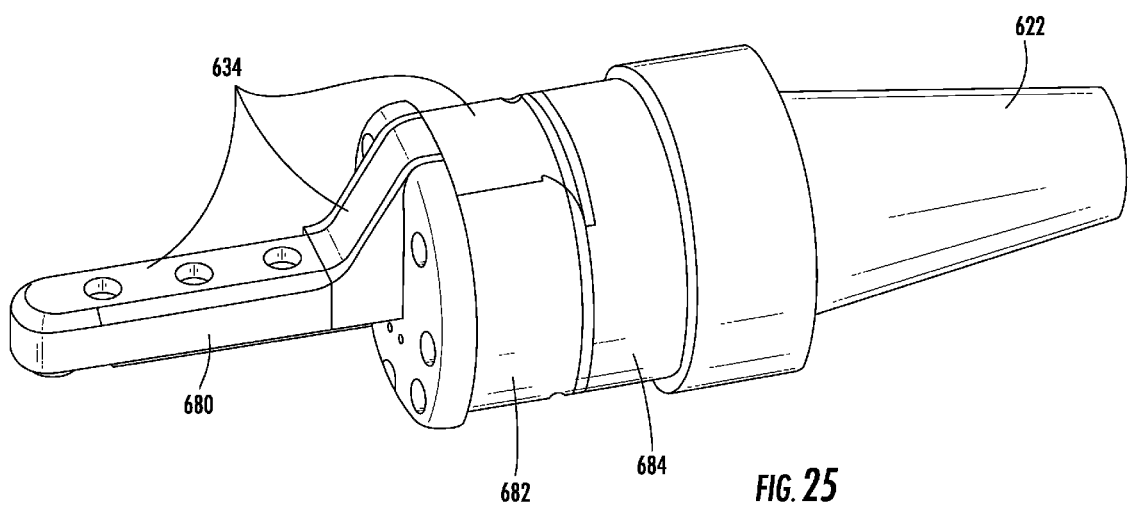
FIG. 25 is a perspective view of the power transmission of FIG. 18 with its collar hidden for clarity.

Referring to FIG. 11, a power transmission 410 according to a fourth preferred embodiment of the present invention is shown. The power transmission 410 includes a first shaft 422, a second shaft 424 and a housing 412 which follows a helical path. As in the previously described embodiments, power is transferred between the first and the second shaft by a plurality of beads which travel through the housing 412 and interface with first and second sprockets respectively attached to the first shaft 422 and the second shaft 424. This fourth embodiment is representative of the ability to provide complex bead paths for a power transmission according to the present invention. Alternatively, other paths and corresponding housing configuration could be provided including curves with variable or fixed radius.

Referring to FIGS. 12-17, a power transmission 510 according to a fifth preferred embodiment of the present invention is shown. The power transmission 510 includes an input shaft 522 connected with an input sprocket 518 and four output shafts 524 including four integrally formed sprockets 520. Ball bearings 536 are preferably provided to reduce friction caused by rotation of the input sprocket 518. Alternatively, each of the output shafts 524 can also be provided with ball bearings. Each of the sprockets 518, 520 makes contact with beads 516 which move within a channel 514, the sprockets 518, 520 forming a portion of the channel 514. The beads 516 and sprockets 518, 520 are held in a housing 512 having a base portion 513 and a cover portion 534. In use, the input sprocket 518 can be rotated using the shaft 522 to motivate the beads 516 along a semi-spherical surface of the housing 512 thereby resulting in the rotation of the output sprockets 520 and the shafts 524 integrally formed therewith. Preferably, milling bits are integrally formed with or attached to the shafts 524.

An adjustment nut 542 is provided to adjust the input shaft 522 up and down, as shown by arrows 5', to adjust an effective width of the channel 514 adjacent to the input sprocket 518. In this manner, a bead preload adjustment can be made to reduce backlash caused by gaps between the beads 516. As shown in FIG. 16, the output sprockets 520 are preferably formed integrally with the output shaft 524 in a manner similar to that shown in FIGS. 5 and 6. Retaining rings 544 are preferably provided for axially retaining the output shaft 524. Alternatively, the output sprockets can be configured in any suitable manner. Further, while each of the output shafts 524 and sprockets 520 are depicted as being identical and symmetrically arranged, alternatively, the output shafts can be positioned in any suitable manner at any suitable angle and employ sprockets of varying diameter such that different output shafts on the power transmission have different gear ratios. Also, while the power transmission 510 includes a single continuous channel 514, alternatively, using valve components, beads can be selectively redirected to different ones of the output sprockets such that according to a user's preference, less than all of the output sprockets are motivated at a given time.

Referring to FIGS. 18-25, a power transmission 610 according to a sixth preferred embodiment of the present invention is shown. The power transmission 610 includes a housing having a first base portion 680, a second base portion 682, a third base portion 684, and cover portions 634. An input shaft 622 is connected with an input sprocket 618, and an output sprocket 620 is provided in the form of a spindle having an aperture 624 for insertion of a milling bit or other suitable tool component. Roller bearings 636 are preferably provided to reduce rotational friction of the input shaft 622, and radial ball bearings 650 and thrust ball bearings 652 are preferably provided to reduce rotational friction of the output sprocket 620. Alternatively, any suitable bearing configuration can be utilized to minimize friction of rotating components of the power transmission.

Each of the sprockets 618, 620 makes contact with beads 616 which are movable within a channel 614 in the base portions 680, 682, 684, with the outer peripheries of the input and output sprockets 618, 620 forming portions of the channel 614. The covers portions 634 retain and conceal the beads 616 in the channel 614, and a collar 662 is useful as an anchor point to prevent rotation of the base portions 680, 682, 684, and connected components during operation of the power transmission 610.

The beads 616 and the bearings 636, 650, 652 are preferably lubricated to reduce friction during operation of the power transmission 610. Lubrication passages 656 allow movement of lubricating fluid through the power transmission 610, which can be added through a lubrication aperture 658. A bearing seal 660 is provided in contact with the input shaft 622 to retain lubricating fluid within the power transmission 610. Ring seals 672 are also provided for retaining lubricating fluid and preventing coolant and lubricating fluid from becoming mixed.

Coolant passages 664 are provided for maintaining acceptable temperature during operation. During use, a coolant supply is preferably connected to a coolant inlet 666 on the collar 662, and supplied coolant fluid flows through the coolant passages 664 and out the coolant outlets 668 as shown by flow arrows 7'.

During use, the shaft 622 can be inserted into a receiving portion of a milling machine arm, for example a mill chuck. Further, a milling bit, for example an end mill, can be inserted into the spindle aperture 624 and affixed thereto, preferably with the aide of a plurality of set screws installed through set screw bores 654. When rotation is imparted to the input sprocket 618, the beads 616 are moved through the channel 614, with adjacent beads pushing one another along a path shown in detail in FIG. 24 to result in the rotation of the output sprocket 620. A milling bit connected to the sprocket 620 can be used to remove material from a work piece.

While the output sprocket 620 is shown having an axis of rotation approximately perpendicular to an axis of rotation of the input sprocket 618, alternatively, the axis of rotation of the output sprocket 620 can be located in any suitable position at any suitable angle relative to the input sprocket 618. Alternatively, a power transmission can be provided in which the position of an output sprocket is adjustable relative to a position of an input sprocket depending on a user's preference.

Figure 26:
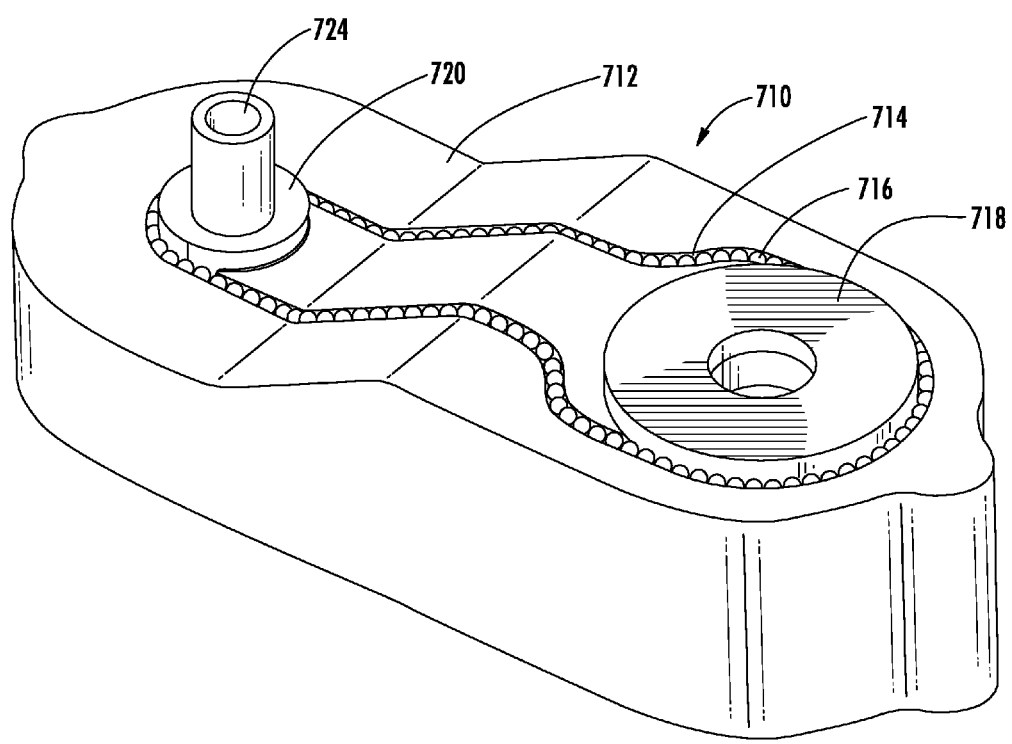
FIG. 26 is a perspective view of a power transmission according to a seventh preferred embodiment of the present invention with a cover portion hidden for clarity.
Figure 27:
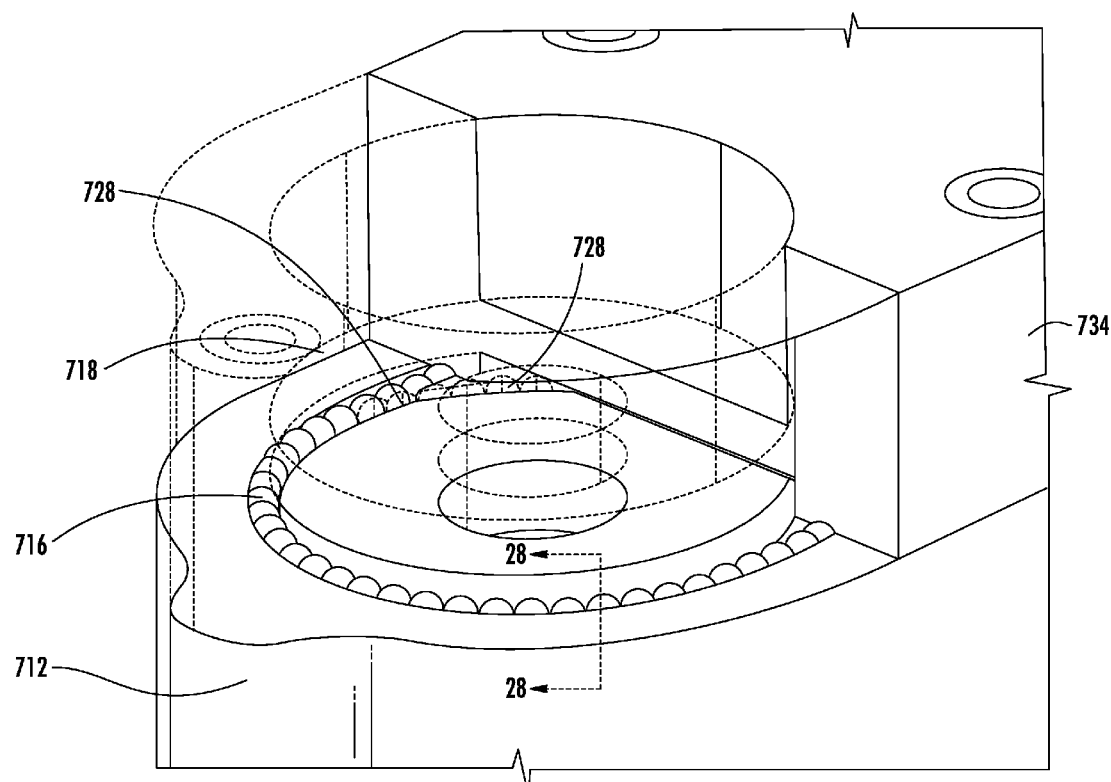
FIG. 27 is a perspective view of the power transmission of FIG. 26 with a cover portion shown cutaway for clarity.
Figure 28:
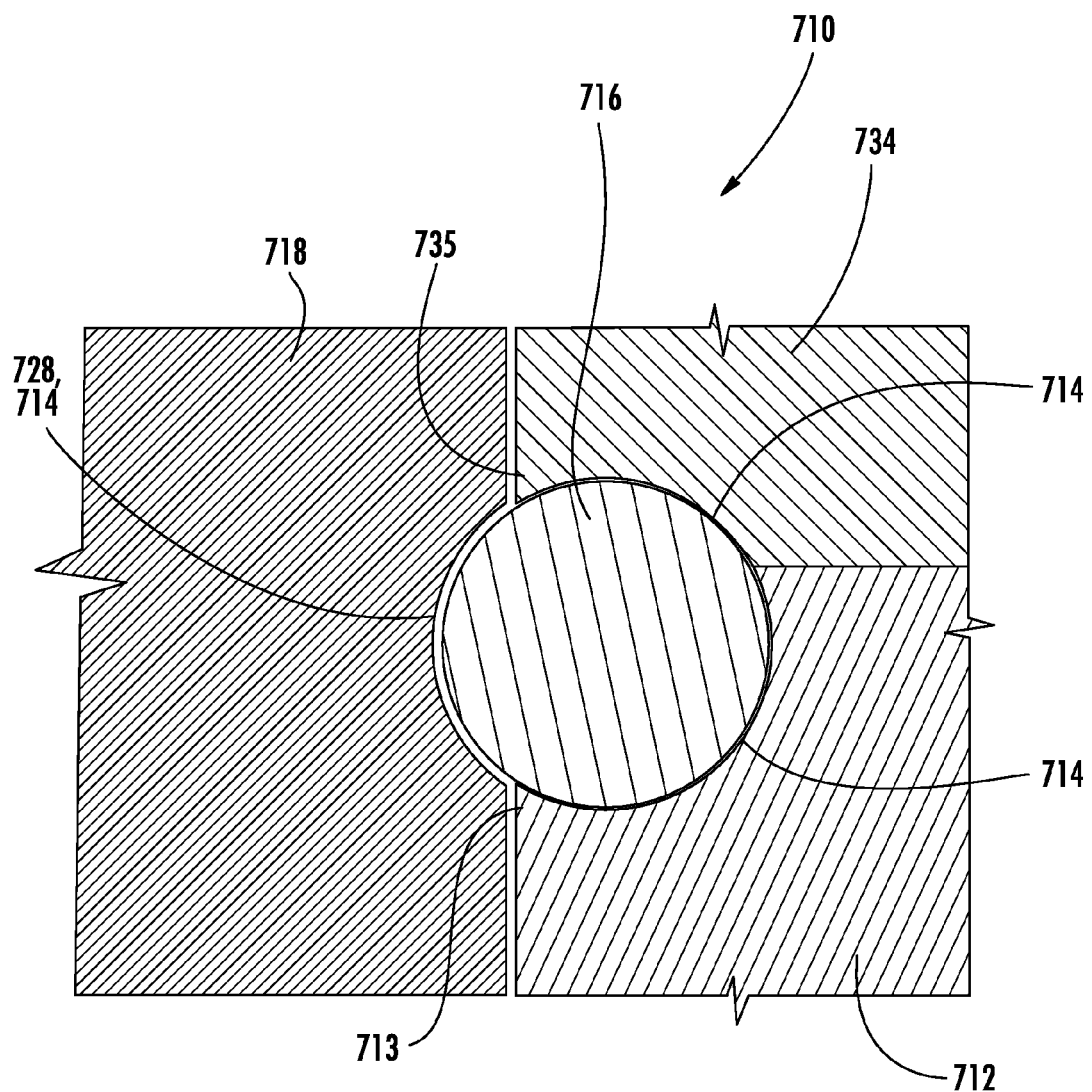
FIG. 28 is a cross-section view of the power transmission of FIG. 26 taken along line 28-28 of FIG. 27.

Referring to FIGS. 26-28, a power transmission 710 according to a seventh preferred embodiment of the present invention is shown. The power transmission 710 includes an input sprocket 718 and an output shaft 724 connected to an output sprocket 720. Each of the sprockets 718, 720 makes contact with beads 716 which move within a channel 714 having a circular cross-section. The channel 714 is defined by a housing including a first housing portion 712 and a second housing portion 734 (hidden for clarity in FIG. 26). The channel 714 is further defined by the sprockets 718, 720. The sprockets 718, 720 include cups 728 which have spherical contact surfaces.

As shown clearly in FIG. 28, in the portion of the channel 714 in which the sprockets 718, 720 engage the beads 716, the first and second housing portions 712, 734 retain the beads 716 within the channel 714 without the assistance of the sprockets 718, 720. Extending portions 713, 735 of the first and second housing portions 712, 734 help retain the beads such that even if sprockets 718, 720 are removed from the transmission 710, the beads 716 are retained within the channel 714 along the entire bead path. This configuration is especially significant in transition areas where the beads 716 begin to engage the sprockets 718, 720. Since the beads 716 are always contained by the upper and lower housing portions 712, 734, the beads 716 are prevented from veering from the bead path. Further, as shown, the spherically formed cups 728 of the sprockets 718, 720 are useful to provide close engagement with the portions of the beads 716 extending from the housing portions 712, 734. Alternatively, cups having conical or other suitably formed surfaces allowing close engagement may be used.

In each of the above described embodiments it is preferable that an even number of beads be utilized. In this manner the beads can rotate in opposite directions thru the entire chain thereby minimizing friction. Using an odd number of beads may increase friction since counter rotation of each of the beads is not possible.

While the above-described preferred embodiments of the present invention each employ a continuous channel having a single circuit, alternatively, side pathways can be added as branches to a continuous channel for example for loading beads into the continuous channel or also for acting as clutches or valves for transmitting power from an input sprocket to different output shafts. Accordingly, such clutches or valves can provide for multiple different overlapping or non-overlapping continuous or non-continuous circuits.

Figure 29:
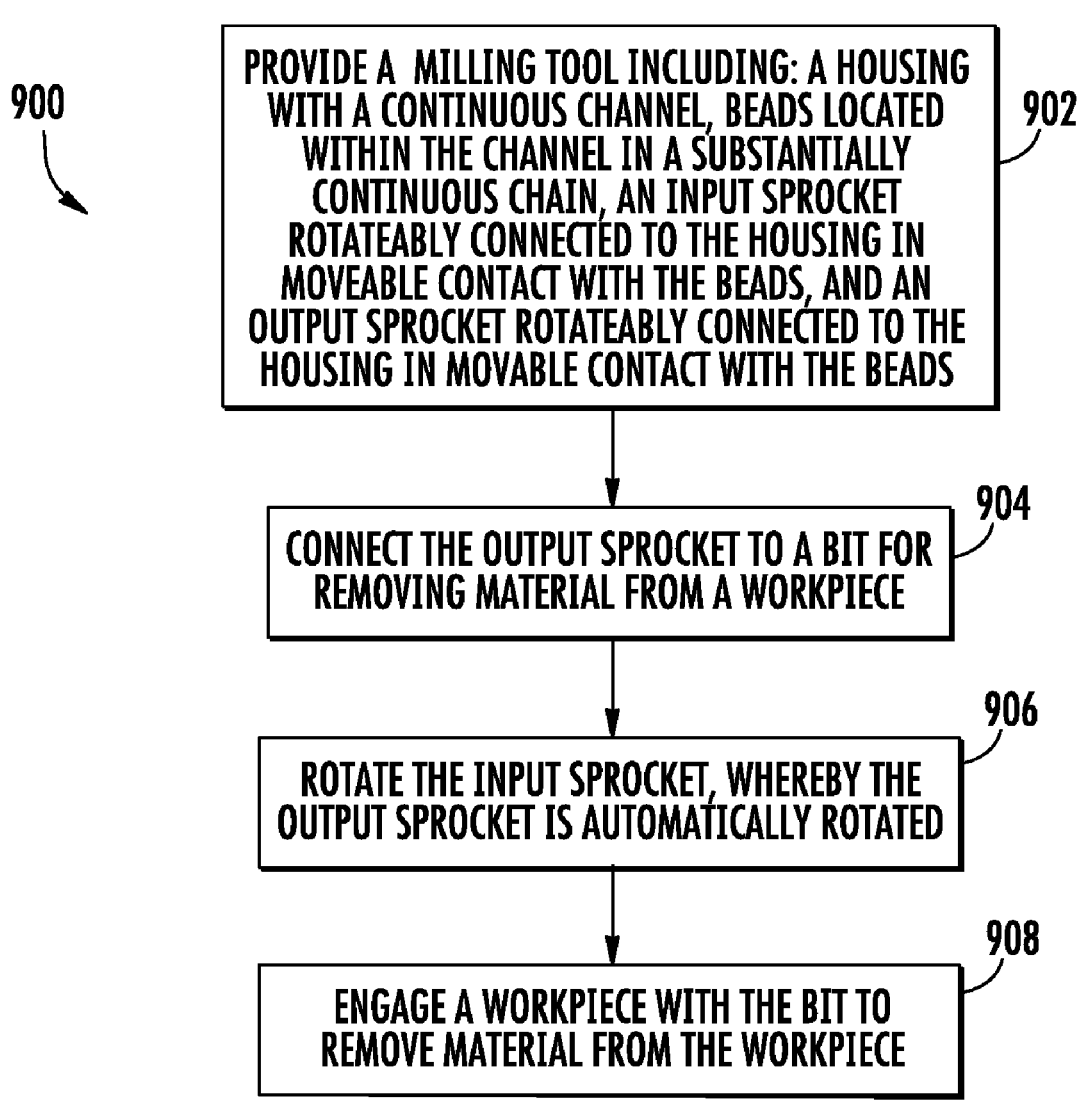
FIG. 29 shows a diagram of a method of removing material from a work piece according to a preferred embodiment of the present invention.

Referring to FIG. 29, a method 900 of removing material from a work piece according to a preferred embodiment of the present invention is shown. The method 900 includes providing a milling tool which includes a housing with a continuous channel, beads located within the channel in a substantially continuous chain, an input sprocket rotateably connected to the housing in movable contact with the beads, and an output sprocket rotateably connected to the housing in movable contact with the beads (step 902). The substantially continuous chain of beads is preferably comprised of unconnected beads. The output sprocket is connected to a bit for removing material from a work piece (step 904). Any suitable bit can be connected to the output sprocket, for example an end mill bit. The input sprocket is rotated (step 906), whereby the output sprocket is automatically rotated. A work piece is engaged with the bit to remove material from the work piece (step 908).

While the preferred embodiments of the invention have been described in detail above, the invention is not limited to the specific embodiments described above, which should be considered as merely exemplary. Further modifications and extensions of the present invention may be developed, and all such modifications are deemed to be within the scope of the present invention as defined by the appended claims.

What is claimed is:

1. A milling tool comprising:
   a housing including a continuous channel;
   a plurality of beads located within the channel and movable therein;
   a first sprocket rotateably connected to the housing and forming a portion of the continuous channel in movable contact with the plurality of beads; and
   a second sprocket rotateably connected to the housing and forming another portion of the continuous channel in movable contact with the plurality of beads, the second sprocket configured for connection to a milling bit for removing material.

2. The milling tool of claim 1, wherein the second sprocket includes a keyed aperture for connection with a keyed shaft.

3. The milling tool of claim 1, further comprising a lubricating fluid in contact with the plurality of beads.

4. The milling tool of claim 1, wherein an axis of rotation of the first sprocket is substantially perpendicular to an axis of rotation of the second sprocket.

5. The milling tool of claim 1, wherein a cumulative gap between the plurality of beads is between about ½% and 3% of a diameter of one of the beads.

6. The milling tool of claim 1, wherein the plurality of beads are substantially spherical.

7. The milling tool of claim 1, wherein the plurality of beads are aligned in single file within the continuous channel.

8. The milling tool of claim 1, wherein each of the plurality of beads is at least one of in contact with and in close proximity to an adjacent one of the plurality of beads, and wherein the continuous channel is substantially entirely filled with beads.

9. The milling tool of claim 1, wherein the plurality of beads are substantially spherical and aligned in single file within the continuous channel, the milling tool further comprising at least one separator between at least two of the plurality of beads for maintaining a desired distance between the at least two of the plurality of beads.

10. The milling tool of claim 1, wherein at least one of the first and second sprockets comprise a plurality of cups at a periphery thereof, and the plurality of beads removably contact the plurality of cups.

11. The milling tool of claim 1, wherein at least one of the first and second sprockets comprise a plurality of cups at a periphery thereof, and the plurality of beads removably contact the plurality of cups, wherein at least one of the plurality of cups comprises a spherical contact surface.

12. The milling tool of claim 1, wherein at least one of the first and the second sprockets comprise an outwardly extending integrally formed shaft.

13. The milling tool of claim 1, wherein at least one of the first and the second sprockets comprise a keyed aperture for removably receiving a keyed shaft.

14. The milling tool of claim 1, further comprising at least one cooling passage within the housing for passing a flow of cooling fluid.

15. The milling tool of claim 1, wherein the continuous channel follows a substantially three-dimensional path, and wherein the second sprocket has an axis of rotation angled with respect to an axis of rotation of the first sprocket.

16. The milling tool of claim 1, further comprising a third sprocket rotateably connected to the housing in movable contact with the plurality of beads.

17. The milling tool of claim 1, further comprising the milling bit connected to the second sprocket.

18. The milling tool of claim 1, wherein the beads are sized between about 3/32 inch and 1/4 inch.

19. The milling tool of claim 1, wherein the housing comprises:
a first body with at least a segment of the continuous channel machined therein, the continuous channel having an open top portion; and
a second body connected to the first body which covers the open top portion of the continuous channel.

20. The milling tool of claim 1, wherein the housing includes extending portions for retaining the plurality of beads along a bead path within the housing in the continuous channel without contact from one of the first and second sprockets.

21. The milling tool of claim 1, wherein the plurality of beads are substantially spherical, wherein at least a portion of the continuous channel is at least partially contoured to a perimeter of the plurality of beads, wherein a portion of the housing comprising the channel comprises an open section in an area adjacent to at least one of the first sprocket and the second sprocket to permit engagement of the at least one of the first sprocket and the second sprocket with the plurality of beads, wherein the housing comprises extending portions, the extending portions defining the open section in at least a transition area where the plurality of beads begin to engage the at least one of the first sprocket and the second sprocket and wherein the open section has a width smaller than a diameter of the plurality of beads, for retaining the plurality of beads along a bead path within the housing in the continuous channel.

22. The milling tool of claim 1, wherein at least one of the first sprocket and the second sprocket is adjustable relative to the housing for adjusting an effective width of the continuous channel adjacent to the at least one of the first sprocket and the second sprocket.

23. A method of removing material from a work piece, the method comprising:
providing a milling tool comprising:
a housing including a continuous channel;
a plurality of beads arranged within the channel in a substantially continuous chain and movable therein;
an input sprocket rotateably connected to the housing and forming a first portion of the continuous channel in movable contact with the plurality of beads for transferring motion to the plurality of beads; and
at least one output sprocket rotateably connected to the housing and forming a second portion of the continuous channel in movable contact with the plurality of beads for rotation by movement of the plurality of beads;
connecting the at least one output sprocket to at least one bit for removing material from a work piece;
rotating the input sprocket, whereby the at least one output sprocket is automatically rotated; and
engaging a work piece with the at least one bit to remove material from the work piece.

* * * * *